United States Patent
Bergann et al.

(10) Patent No.: US 8,228,609 B2
(45) Date of Patent: Jul. 24, 2012

(54) APPARATUS FOR COMBINING INDIVIDUAL LIGHT BEAMS OF DIFFERENT WAVELENGTHS TO FORM A COAXIAL LIGHT BUNDLE

(75) Inventors: Ludwig Bergann, Berlin (DE); Ralf Malz, Jena (DE)

(73) Assignee: LASOS Lasertechnik GmbH, Jena (DE)

( * ) Notice: Subject to any disclaimer, the term of this patent is extended or adjusted under 35 U.S.C. 154(b) by 85 days.

(21) Appl. No.: 12/669,906

(22) PCT Filed: Jun. 7, 2008

(86) PCT No.: PCT/EP2008/004554
§ 371 (c)(1), (2), (4) Date: May 27, 2010

(87) PCT Pub. No.: WO2009/012846
PCT Pub. Date: Jan. 29, 2009

(65) Prior Publication Data
US 2011/0176219 A1  Jul. 21, 2011

(30) Foreign Application Priority Data
Jul. 20, 2007 (DE) .......... 10 2007 034 261

(51) Int. Cl.
*G02B 27/14* (2006.01)
(52) U.S. Cl. ...................................... 359/634
(58) Field of Classification Search .................. 359/634
See application file for complete search history.

(56) References Cited

U.S. PATENT DOCUMENTS

| | | | |
|---|---|---|---|
| 6,101,037 A | 8/2000 | Park et al. | |
| 6,134,050 A | 10/2000 | Conemac | |
| 2004/0105161 A1 | 6/2004 | Tatum et al. | |
| 2005/0247683 A1* | 11/2005 | Agarwal et al. | 219/121.73 |
| 2005/0249457 A1 | 11/2005 | Seyfried et al. | |
| 2006/0274284 A1 | 12/2006 | Peterson et al. | |
| 2009/0121154 A1 | 5/2009 | Westphal et al. | |

FOREIGN PATENT DOCUMENTS

| | | |
|---|---|---|
| CA | 1 217 823 | 2/1987 |
| DE | 33 40 112 C2 | 6/1984 |
| DE | 33 28 349 A1 | 2/1985 |
| DE | 42 14 791 C1 | 7/1993 |
| DE | 196 33 185 A1 | 10/1997 |
| DE | 198 33 132 A1 | 2/1999 |
| DE | 10 2005 054 184 A1 | 5/2007 |
| WO | WO 2006/130724 A2 | 12/2006 |

OTHER PUBLICATIONS

"Catalog 2003" *Linos AG*, Goettingen, XP002493027.

* cited by examiner

*Primary Examiner* — James Jones
(74) *Attorney, Agent, or Firm* — Patterson Thuente Christensen Pedersen, P.A.

(57) ABSTRACT

An apparatus for combining individual light beams to form a coaxial light bundle. The apparatus has a plurality of coupling-in positions, the number of which corresponds to the number of light beams, and also at least one coupling-out position. It is suitable for generating a collimated beam bundle as a multicolor source for use in digital image generation. The apparatus includes an apparatus base body with the coupling-in positions for the light beams and with a coupling-out position for the light bundle and adjusting devices for coaxially orienting the individual light beams relative to the beam direction of the light bundle. The coaxial light bundle can optionally emerge as free beam at the coupling-out position or into an optical waveguide via connecting elements.

15 Claims, 3 Drawing Sheets

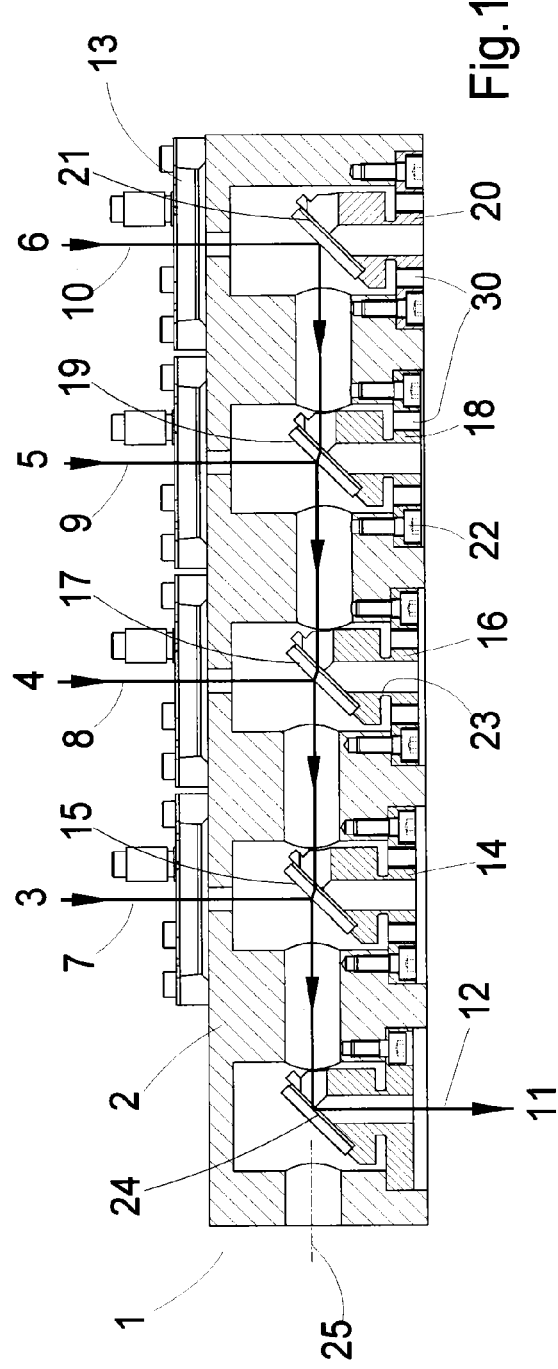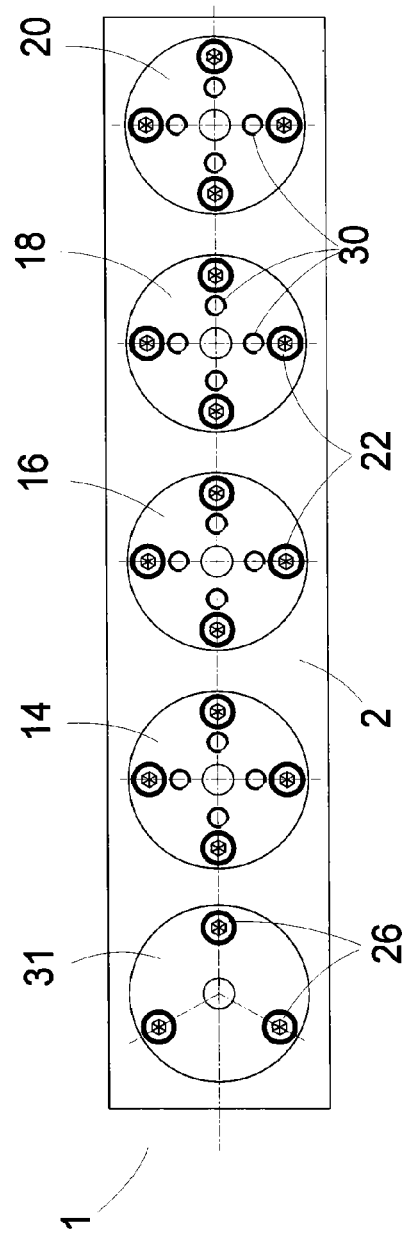

APPARATUS FOR COMBINING INDIVIDUAL LIGHT BEAMS OF DIFFERENT WAVELENGTHS TO FORM A COAXIAL LIGHT BUNDLE

PRIORITY CLAIM

The present application is a National Phase Entry of PCT Application No. PCT/EP2008/004554, filed Jun. 7, 2008, which claims priority to German Application Number 102007034261.8, filed Jul. 20, 2007, the disclosures of which are hereby incorporated by reference herein in their entirety.

FIELD OF THE INVENTION

The invention relates to an apparatus having several coupling-in locations for individual light beams, and at least one coupling-out location for the light beams combined into a coaxial light bundle. The invented apparatus excels by highly precise superposition of the individual light beams and by angular positioning of the coaxial light bundle with angular errors of less than 10 µrad; it is particularly suitable for producing a collimated light bundle as a multicolor source for use in digital image generation.

PRIOR ART

Apparatuses for combining several laser beams of different light wavelengths into a coaxial light bundle are actually known in prior art. A light bundle produced by such apparatuses is employed, e.g., as an RGB multicolor source in microscope imaging, especially in laser scanning microscopes. For such applications, angular positioning of the coaxial light bundle often needs to be made to angular errors of less than 10 µrad.

The apparatuses known in prior art that satisfy these requirements are made from relatively many components in a complicated process, require complex adjustment for precise coupling of the individual light beams into the light bundle, and are difficult to handle because changing individual optical waveguides used to feed the light beams consume a lot of time and, thus, cost.

Moreover, they suffer from an essential disadvantage with a negative effect on accuracy, in that fluctuations of ambient temperature impair the adjustment of the beam path.

SUMMARY OF THE INVENTION

On this premise, the invention is based on the problem to create an apparatus for precisely combining individual light beams into a coaxial light bundle, that can be implemented by the simplest possible technical means manufactured at reasonable cost, has the smallest possible volume, and operates accurately and reliably under varying external conditions, especially during temperature fluctuations.

The problem is solved by an apparatus for precisely combining individual light beams into a coaxial light bundle, comprising
  a body of the apparatus having several coupling-in locations for the light beams and a coupling-out location for the light bundle, and
  adjusting devices for coaxially aligning the individual light beams relative to the beam direction of the light bundle.
Preferably, optical waveguides, especially single-mode optical fibers, are provided for guiding the individual light beams, and connecting elements are provided for coupling the optical waveguides to the apparatus in the coupling-in locations. The coaxial light bundle can optionally exit at the coupling-out location as a free (unguided) beam or enter an optical waveguide via connecting elements.

For producing the light beams, laser radiation sources radiating different light wavelengths may be used to advantage.

The number of adjusting devices corresponds to the number of coupling-in locations, so that one adjusting device is assigned to each coupling-in location. Each of the adjusting devices is provided with a dichroic mirror that is made to reflect the light wavelength of the light beam to be coupled in at the respective location, and to be transparent to the light wavelengths of the light beams intended to penetrate it.

Within the body of the apparatus, the dichroic mirrors are arranged in succession, with the direction of this succession corresponding to the direction of the coaxial light bundle. Each dichroic mirror is aligned relative to the direction of the incident light beam so that the light beam is reflected into the center of the light bundle.

For this purpose, the dichroic mirrors are essentially tilted by 45° relative to the light beam to be coupled in and also by 45° relative to the coaxial light bundle. Each of the dichroic mirrors is connected to a joint to allow adjustment of the reflection direction. These joints may be preferably designed as elastic hinges, with each elastic hinge being coupled to one or several manipulators with which the reflection direction can be altered and, thus, adjusted.

Varying with the embodiment of the invented apparatus, the manipulators for manual operation are designed, e.g., in the form of adjusting screws or rotatable wedge plates, or the manipulators may be coupled to controllable electromechanical drive units connected to a control unit designed to generate control commands.

The body of the apparatus may be made as a monolithic body of glass, vitroceram, ceramics, plastic or metal, preferably stainless steel or anodized aluminum. It is recommendable to make the adjusting devices including the elastic hinges of the same material of which the body of the apparatus is made.

In a further development of the invented apparatus, the individual light beams are provided with collimating optics or one- or multilens telescope arrangements for influencing the beam, which may be arranged at the coupling-in locations.

For connecting the optical waveguides with the body of the apparatus at the coupling-in locations, special, highly precise fiber connectors can be provided. These fiber connectors are provided with connecting elements that have, on the side of the optical waveguide and on the side of the body of the apparatus, reference surfaces that correspond to each other and ensure accurate and reproducible alignment of the optical waveguide relative to the body of the apparatus and, thus, to the respective dichroic mirror.

In this connection, in one embodiment of the invented apparatus, the body of the apparatus has a polished outer surface with areas that serve as reference faces for receiving the fiber connectors. Centering collars serve as auxiliary means for aligning the fiber connectors and, thus, the optical waveguides relative to the respective dichroic mirror in the body of the apparatus, with one centering collar seated on each of the areas and being fixed to it. Attached to each centering collar is a spring ring fitting the form of the centering collars.

This enables fast and problem-free alignment of the optical waveguides relative to the apparatus when they are changed or re-plugged.

In one embodiment, the material in the said areas is harder than the rest of the material of which the body of the apparatus consists. For this purpose, the material of the body of the apparatus (depending on its kind) is either hardened, or the body of the apparatus is provided with a hard coating in these areas, or a layer of harder material is embedded into the material of the body of the apparatus.

Furthermore it is within the scope of the invention to provide, in the coaxial light bundle at the coupling-out location, means for beam shaping, such as, e.g., for beam expansion or for focusing the light bundle.

BRIEF DESCRIPTION OF THE DRAWINGS

Below, the invention will be explained in more detail in an exemplary embodiment, with reference to the accompanying drawings in which:

FIG. 1 depicts the principle of the invented apparatus by a section through the optical axes of the light beams to be combined and of the coaxial light bundle, FIG. 2 depicts the invented apparatus in a bottom view of the arrangement shown in FIG. 1, looking at the adjusting devices embedded in the body of the apparatus.

DETAILED DESCRIPTION

Figure 3:
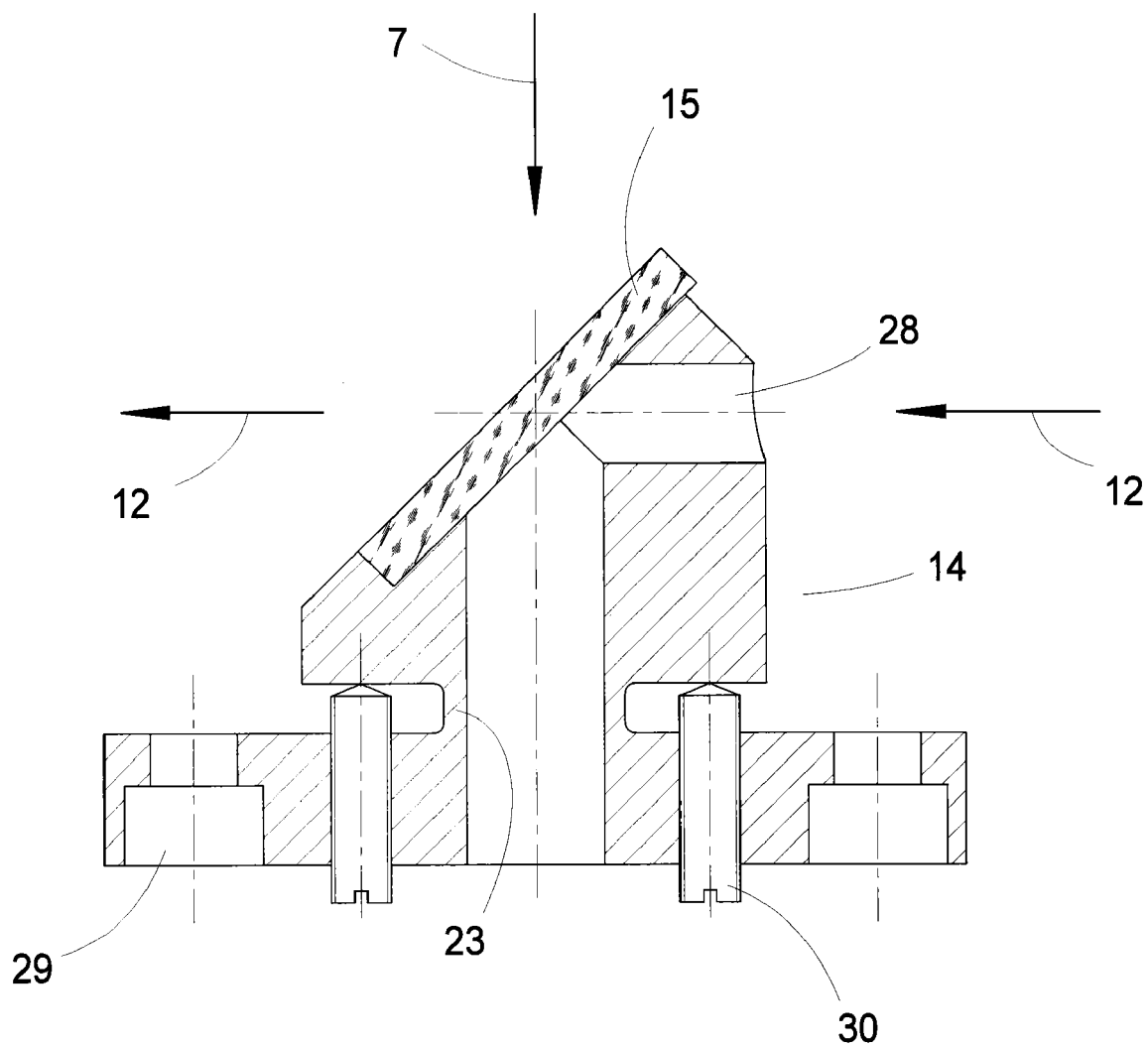
FIG. 3 depicts, as an excerpt from FIG. 1, one of the adjusting devices in a section through the beam guiding orifices for the light beam to be coupled in, and for the coaxial light bundle.

FIG. 1 depicts a section of the invented apparatus 1. It can be seen that the apparatus 1 includes a body 2, which is provided with coupling-in locations 3, 4, 5 and 6 for individual light beams 7, 8, 9 and 10, and one coupling-out location 11, at which a coaxial light bundle 12 exits, in which the light beams 7, 8, 9, 10 are combined.

In one embodiment, the light beams 7, 8, 9, 10 are laser beams of different light wavelengths, which are fed to the apparatus 1 by optical waveguides (not shown in the drawing). For example, light of the "red" wavelength range is coupled into the apparatus 1 by light beam 7. Let the other light beams 8, 9, 10 be intended for light wavelengths in the "green", "blue" and "ultraviolet" ranges.

Fiber connectors 13 are provided for connecting the optical waveguides with the body of the apparatus 2, i.e. for coupling the light beams 7, 8, 9, 10 into the apparatus 1.

In the example embodiment chosen here, the coaxial light bundle 11 exits as a free light beam. Alternatively, though, it is also feasible to arrange a fiber connector 13 also at the coupling-out location 11, and to conduct the coaxial light bundle 12 within an optical waveguide from the apparatus 1 to an imaging instrument.

Assigned to the coupling-in location 3 is an adjusting device 14, which bears a dichroic mirror 15. In an analogous manner, an adjusting device 16 with a dichroic mirror 17 is assigned to coupling-in location 4, an adjusting device 18 with a dichroic mirror 19 to coupling-in location 5, and an adjusting device 20 with a dichroic mirror 21 to coupling-in location 6.

The dichroic mirrors 15, 17, 19, 21 are aligned essentially at an angle of 45° relative to the respective light beam to be coupled in, i.e. 7, 8, 9, 10, and also at an angle of 45° relative to the coaxial light bundle 12 run within the body of the apparatus 2. The word "essentially" in this connection means that the decisive criterion is not an inclination of exactly 45°, but rather the direction in which the respective light beam 7, 8, 9, 10 is reflected when it hits the dichroic mirror 15, 17, 19, 21 assigned to it. This direction should correspond, with the least possible deviation, to the direction of the center of the coaxial light bundle 12 within the body of the apparatus 2.

To achieve this, each of the adjusting devices 14, 16, 18, 20 is provided with an elastic hinge 23. By means of the elastic hinges 23, the inclinations of the dichroic mirrors 15, 15, 19, 21 can be adjusted by the amount needed to satisfy the requirement mentioned. This adjustment facility is explained in more detail below in connection with FIG. 3.

It is to be understood that it is also within the scope of the invention if the said adjustment is used deliberately to set slight differences in beam direction between the individual light beams.

The dichroic mirror 15 is designed so as to reflect the light wavelength of light beam 7, while being transparent to the light wavelengths of light beams 8, 9 and 10. In an analogous manner, the dichroic mirror 17 is made to reflect light beam 8 and to be transparent to light beams 9 and 10, and the dichroic mirror 19 is made to reflect light beam 9 and to be transparent to light beam 10, whereas the dichroic mirror 21 is made to reflect light beam 10.

So that the coaxial light bundle 12 can be coupled out in the direction as shown in FIG. 1, a mirror 24 is provided within the body of the apparatus 2, this mirror being made to reflect the wavelengths of all light beams 7, 8, 9, 10 coupled in, so that the light beams 7, 8, 9, 10 combined in the coaxial light bundle 12 are, within the body of the apparatus 2, are deflected by mirror 24 to the coupling-out location 11.

Alternatively it is possible, within the scope of the invention, to do without mirror 24 and thus to shift the coupling-out location 11 to location 25. There, too, it is alternatively possible to have the light bundle 12 exit as a free beam or to couple it into an optical waveguide by means of another fiber connector 13.

It is further feasible to replace the mirror 24 with a polarizing beam splitter and thus to combine the coaxial light bundle 12 with another light beam that is perpendicular to it and may, in itself, be a bundle of light of different wavelengths.

As can be seen in FIG. 1, the adjusting device 14, 16, 18, 20 are fastened to the body of the apparatus 2 by means of screw connections, for example, by the screws 22.

In the light beams 7, 8, 9, 10 (for example at the coupling-in locations 3, 4, 5, 6), collimating lenses may be arranged which have a focal length of, e.g., f=4 mm and which cause the light beams 7, 8, 9, 10 to hit the dichroic mirrors 15, 17, 19, 21 with beam diameters of about 1 mm if these light beams are guided there by optical fibers of NA≈0.1.

Comparably, optical elements may be arranged in the coaxial light bundle 12 at the coupling-out location 11, which cause an expansion of the light bundle 12 to a beam diameter that corresponds to the intended purpose of the light bundle 12.

The body of the apparatus 2 may, for example, made of stainless steel of a low expansion coefficient. To minimize the external influence of temperature fluctuations on the apparatus 1 and, thus, accuracy deviations in beam guiding, the adjusting devices 14, 16, 18, 20 including the elastic hinges 23 should be made of the same stainless steel.

FIG. 2, a bottom view of the arrangement shown in FIG. 1, depicts the adjusting devices embedded in the body of the apparatus. One can see the adjusting devices 14, 16, 18, 20 inserted in the body of the apparatus 2 at the coupling-in locations 3, 4, 5, 6, as well as the cheese-head screws 22 with which the adjusting devices 14, 16, 18, 20 are fastened to the body of the apparatus 2.

At the coupling-out location 11, a holder 31 for the mirror 24 is shown which is fastened to body of the apparatus 2 with three cheese-head screws 26.

FIG. 3 shows the adjusting device 14 as an exemplary detail from FIG. 1. Here one can see the dichroic mirror 15 and an orifice 28 for the coaxial light bundle 12.

Also to be seen are the holes 29 for the cheese-head screws 22 with which the adjusting device 14 is fastened to the body of the apparatus 2, the reduction of the material cross section that acts as an elastic hinge 23, and the adjusting screws 30 passing through threaded holes in the adjusting device 14.

Four each of the said adjusting screws 30, the locations of which can be seen from FIG. 3 in connection with FIG. 2, are assigned to the adjusting device 14 as well as to each of the other adjusting devices 16, 18 and 20. By manipulation of the adjusting screws 30 and the ensuing influencing of the respective elastic hinge 23, the alignment of the dichroic mirror 15 can be varied until it is sure that the coupled-in light beam 7 is precisely aligned with the desired direction, viz. that of the coaxial light bundle 12.

Depending on the properties of the material of which consist the elastic hinges 23 or, in case of a monolithic design, the body of the apparatus 2 including the elastic hinges 23, aligning the dichroic mirror 15 is effected by the plastic or elastic deformation brought about by the said manipulation.

A more developed embodiment of the invented apparatus features not only means—in the form of the adjusting devices 14, 16, 18, 20—provided for the angular alignment of the light beams 7, 8, 9, 10 to be coupled in, but also means by which the light beams 7, 8, 9, 10 to be coupled in can be shifted perpendicularly to the beam direction, as explained below.

Figure 4:
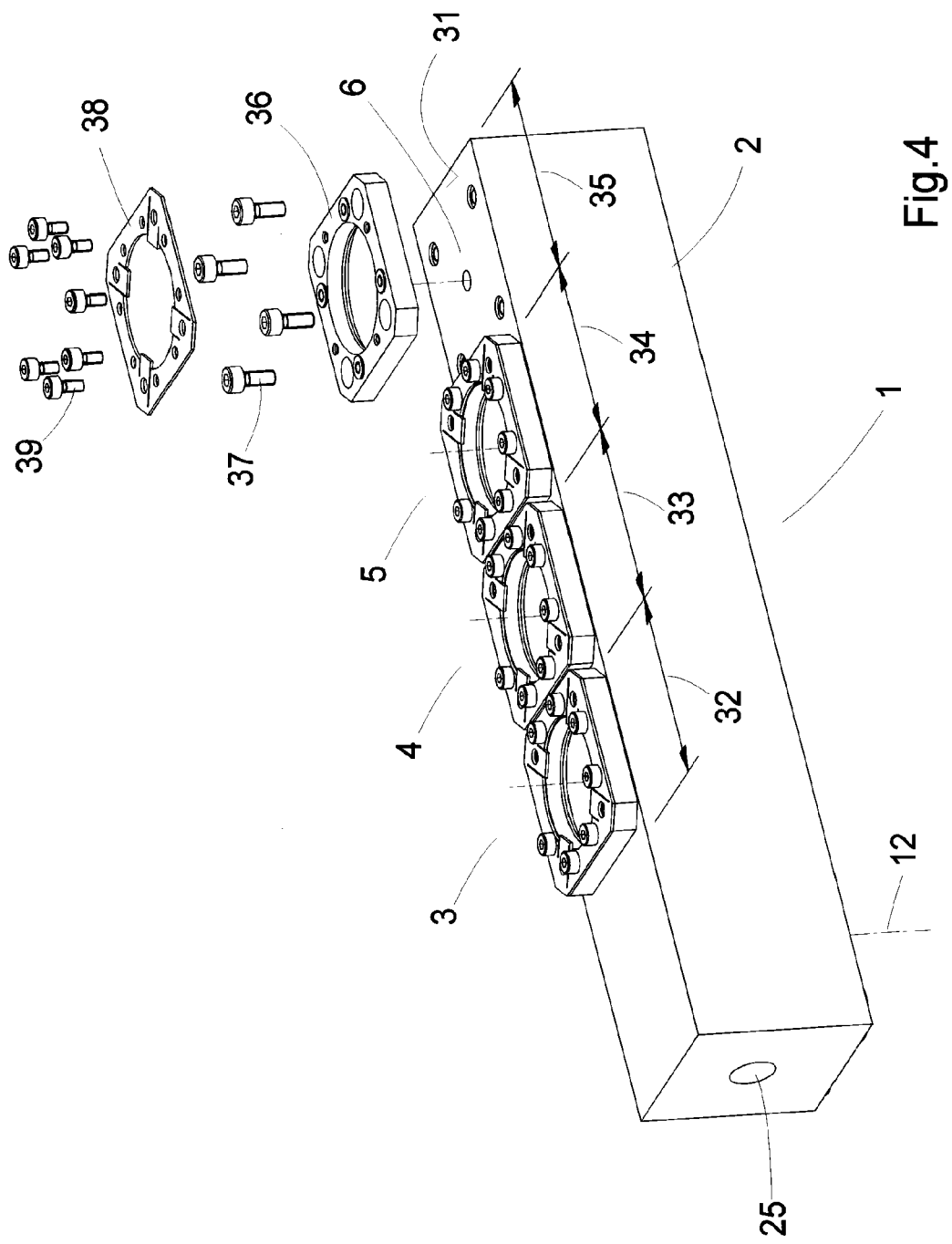
FIG. 4 depicts a perspective view of the invented apparatus, looking at the coupling-in locations for the light beams to be combined.

As FIG. 4 shows, the body of the apparatus 2 is provided with a polished outer surface 31 of high planarity, which has four areas 32, 33, 34 and 35. The areas 32, 33, 34, 35 serve as reference faces for seating the fiber connectors 13 and for their accurate and reproducible aligning.

According to the invention, centering collars 36 are provided for the purpose of aligning the fiber connectors 13 as they are coupled to the body of the apparatus 2, with one centering collar 36 seated on, and fastened to, one of the areas 32, 33, 34, 35 each. As FIG. 4 shows for the coupling-in location 6 as an example, the centering collars 36 are fastened to the body of the apparatus 2 by means of cheese-head screws 37.

Attached to each centering collar 36 and matching its shape is a spring ring 38, which is fastened by, e.g., eight cheese-head screws 39.

The material of the four areas 32, 33, 34, 35 is preferably harder than the rest of the material of which the body of the apparatus 2 consists. For this purpose, depending on the kind of material of the body of the apparatus 2, either the material is hardened at the surface or provided with a hard coating, or a layer of harder material is embedded in the material of the body of the apparatus 2.

LIST OF REFERENCES 1 apparatus
2 body of the apparatus
3, 4, 5, 6 coupling-in locations
7, 8, 9, 10 light beams
11 coupling-out location
12 coaxial light bundle
13 fiber connector
14, 16, 18, 20 adjusting devices
15, 17, 19, 21 dichroic mirrors
22 cheese-head screw
23 elastic hinge
24 mirror
25 location
26 cheese-head screw
27 seating face
28 orifice
29 hole
30 adjusting screws
31 outer surface
32, 33, 34, 35 areas
36 centering collar
37 cheese-head screw
38 spring ring
39 cheese-head screw

What is claimed is:

1. An apparatus for combining individual light beams into a coaxial light bundle, comprising
   a body of the apparatus having several coupling-in locations for the light beams, and a coupling-out location for the light bundle, the light wavelengths of the individual light beams differing from each other,
   dichroic mirrors, which are assigned to the coupling-in locations, each mirror being reflective to the light wavelength of one light beam to be coupled in,
   adjusting devices structured to facilitate coaxially aligning the individual light beams relative to the beam direction of the light bundle,
   wherein each of the dichroic mirrors is operably connected to the body with a respective joint for influencing the direction of the light beam that is reflected and thus deflected into the direction of the light bundle, and
   wherein each of the respective joints comprise elastic hinges and each elastic hinge is coupled with a manipulator for influencing the reflection direction of the reflected light beam.

2. An apparatus as claimed in claim 1, further comprising optical waveguides for guiding the light beams and the light bundle and connecting elements for coupling the optical waveguides at the coupling-in locations and/or at the coupling-out location.

3. The apparatus as claims in claim 2, further comprising laser radiation sources that generate the light beams.

4. An apparatus as claimed in claim 1, wherein the number of adjusting devices corresponds to the number of the coupling-in locations and each coupling-in location is assigned an adjusting device.

5. An apparatus as claimed in claim 1, in which the dichroic mirrors are aligned with the direction of the light beams such that the light beams are reflected into the optical axis of the light bundle, and in which the dichroic mirrors each are arranged so as to be essentially inclined by 45° relative to the respective light beam and inclined by 45° relative to the light bundle to be coupled out.

6. An apparatus as claimed in claim 1,
   wherein each of the manipulators comprise at least one of adjusting screws for manually influencing the reflection direction of the reflected light beam, rotatable wedge plates for manually influencing the reflection direction of the reflected light beam, and
   controllable electromechanical drive units coupled to the hinges for influencing the reflection of the reflected light beam and the drive units are connected to a control unit that is designed to generate control commands.

7. An apparatus as claimed in claim 1, in which the body of the apparatus is monolithic and made of glass, vitroceram, ceramics, plastics or metal.

8. An apparatus as claimed in claim 7, in which the body of the apparatus is monolithic and made of stainless steel or anodized aluminum.

9. An apparatus as claimed in claim 1, in which the elastic hinges are parts of the adjusting devices and in which the elastic hinges and the adjusting devices are made of the same material as that of the body of the apparatus.

10. An apparatus as claimed in claim 1, further comprising optics, for influencing the beams located at the coupling-in locations in the beam paths of the individual light beams.

11. An apparatus as claimed in claim 10 wherein the optics comprise collimating lenses or single- or multilens telescope arrangements.

12. An apparatus as claimed claim 2, further comprising fiber connectors at the coupling-in locations for connecting the optical waveguides with the body of the apparatus.

13. An apparatus as claimed claim 12, in which the body of the apparatus has an at least partially polished outer surface with areas that serve as reference faces for seating and aligning the fiber connectors and, thus, the optical waveguides, relative to the respective dichroic mirror in the body of the apparatus, and centering collars that align the fiber connectors, with one centering collar being seated on, and fastened to, each one of the areas.

14. An apparatus as claimed in claim 1, further comprising beam shaping elements at the coupling-out location in the coaxial light bundle.

15. An apparatus as claimed in claim 14, wherein the means for beam shaping comprises a single- or multilens telescope arrangement.

* * * * *